(12) United States Patent
Weller et al.

(10) Patent No.: US 12,302,798 B2
(45) Date of Patent: May 20, 2025

(54) TWINE TENSION MONITORING APPARATUS

(71) Applicant: AGCO Corporation, Duluth, GA (US)

(72) Inventors: Lucas Andrew Weller, Hesston, KS (US); Eric John Herbers, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 46 days.

(21) Appl. No.: 18/048,490

(22) Filed: Oct. 21, 2022

(65) Prior Publication Data
US 2023/0131556 A1    Apr. 27, 2023

Related U.S. Application Data

(60) Provisional application No. 63/263,023, filed on Oct. 26, 2021.

(51) Int. Cl.
*A01F 15/14*    (2006.01)
*B65B 13/22*    (2006.01)
*B65B 13/26*    (2006.01)

(52) U.S. Cl.
CPC .......... *A01F 15/148* (2013.01); *A01F 15/145* (2013.01); *B65B 13/22* (2013.01); *B65B 13/26* (2013.01)

(58) Field of Classification Search
CPC ...... A01F 15/145; A01F 15/148; B65B 13/26; B65B 27/12; B65B 13/22
See application file for complete search history.

(56) References Cited

U.S. PATENT DOCUMENTS

| | | |
|---|---|---|
| 8,671,834 B1 | 3/2014 | Rotole et al. |
| 2015/0305247 A1 | 10/2015 | Chaney |
| 2021/0195843 A1 | 7/2021 | Regier et al. |
| 2022/0000036 A1 | 1/2022 | Regier et al. |
| 2022/0000037 A1 | 1/2022 | Ensminger et al. |

FOREIGN PATENT DOCUMENTS

| | | | | |
|---|---|---|---|---|
| EP | 2737789 A2 * | 6/2014 | ........... | A01F 15/148 |
| EP | 3199015 A | 8/2017 | | |
| WO | WO-2010136501 A1 * | 12/2010 | ......... | A01F 15/0825 |

OTHER PUBLICATIONS

UK Intellectual Property Office, Search report for related UK Application No. GB2115840.7, dated Apr. 11, 2022.

* cited by examiner

*Primary Examiner* — Jimmy T Nguyen

(57) ABSTRACT

A twine tension monitoring apparatus includes a twine tension monitoring portion and a signalling portion. The twine tension monitoring portion includes a laterally extending finger moveable about a horizontally extending axis between a first position and a second position, in which the first position corresponds to a low tension condition and the second position corresponds to a tensioned condition. The signalling portion provides a signal indicating the position of the laterally extending finger and so indicates the tension being monitored.

17 Claims, 12 Drawing Sheets

TWINE TENSION MONITORING APPARATUS

BACKGROUND OF THE INVENTION

Field of Invention

The present invention relates to an apparatus for detecting potential malfunctions in a knotter tying device used in the baling of crop material such as hay or straw by monitoring the tension in the twine used to bind the bales during the baling process.

Description of Related Art

It is known to provide a baler for producing rectangular bales in which successive charges or flakes of processed crop material are introduced into a baling chamber and compacted together by a reciprocating plunger to form a rectangular bale. Successive charges or flakes advance the forming bale within the baling chamber. Strands of binding material, such as twine, are located within the baling chamber across a leading edge of the forming bale and drawn out from suitable reels of binding material as the forming bale is advanced through the baling chamber. Once a bale of suitable size has been formed a knotter is actuated to enable tying of the strands of flexible binding material about the formed bale to secure the ends of the binding material together and to cut the binding material from the tied bale so that the process may be repeated for the next bale to be formed. Typically, several strands of flexible binding material are aligned along a length of the bale being formed, each strand being provided with an associated knotter. Once each of the strands has been severed, the bale can be ejected from the baler.

It is important that any failure of the tying process is detected promptly. Failure may arise for many reasons. For example, the binding material may become over tensioned and break. This may occur during initial forming of a bale when the impact of the reciprocating plunger is not as well cushioned by the initial charges or flakes of compacting crop material creating the forming bale as during later stages of bale formation. Also, in certain circumstances the binding material might not follow an intended path thorough the knotter and become pulled from the knotter before the tying process has been completed.

A variety of methods detecting such failures are known, including checking completion of a binding loop of wrapping material, detection of excessive knotter torque or tension measurement of the binding material within a twine disc.

The reliability of the monitoring method is important. Checking to determine a false indication of a potential mistie or the like is as much an issue as remedying a correctly detected problem. Both involve stopping operation of the baler such that no bales are being produced while the potential issue is addressed by an operator.

BRIEF SUMMARY

According to a first aspect of the invention, a twine tension monitoring apparatus for detecting the twine tension in a baler during operation of the baler comprises a twine tension monitoring portion and a signalling portion connected to the monitoring portion, in which the twine tension monitoring portion is, in use, located between a knotter and the leading edge of a forming bale, and comprises an element rotatable about a horizontally extending axis between a first position and a second position, in which the first position corresponds to a low tension condition and the second position corresponds to a tensioned condition, the signalling portion providing a signal indicating the position of the first rotatable element.

Preferably, the rotatable element comprises a first laterally extending finger supported on a first armature connected to a shaft having a longitudinally extending axis, the longitudinally extending axis corresponding to the horizontally extending axis about which the first laterally extending finger moves.

More preferably, the first laterally extending finger is biased towards the first position. Even more preferably, a torsion spring biases the shaft to bias the first laterally extending finger towards the second position.

Preferably, the rotatable element comprises a third portion of a shaft offset from a first portion of the shaft, the first portion of the shaft being connected to an armature. More preferably the third portion of the shaft is biased towards the first position. More preferably a torsion spring biases the shaft to bias the third portion of the shaft towards the second position.

Preferably, the first position corresponds to the rotatable element riding on an upper surface of the forming bale and the second position being spaced from the surface of a forming bale.

Preferably, the signalling portion is mechanically connected to the monitoring portion.

Preferably the signalling portion is electrically connected to the monitoring portion.

More preferably, the signalling portion comprises an electrical sensor in electrical communication with an electronic control unit, the electronic control unit being in electrical communication with a Human Machine Interface.

Preferably, the electrical sensor is an electrical switch actuated when the rotatable element is in the first position. More preferably, the electrical sensor signals the angular displacement of the rotatable element between the first position and the second position.

According to a second aspect of the invention a control system for a twine tension monitoring apparatus according to the first aspect of the invention in which the signalling portion comprises an electrical sensor in electrical communication with an electronic control unit, the electronic control unit being in electrical communication with a Human Machine Interface, wherein the electronic control unit receives signals representative of the actual position of the first laterally extending finger from the electrical sensor, determines the anticipated position of the first laterally extending finger, compares the received signals representative of the actual position of the first laterally extending finger with the anticipated position of the first laterally extending finger and, in the event of a disparity generates a signal to the Human Machine Interface to cause an error condition to be signalled to the operator.

Preferably, in the event of the electronic control unit detecting a disparity the electronic control unit also generates a signal to cause operation of the baler to cease.

According to a third aspect of the invention an agricultural baler is provided with a twine tensioning apparatus according to the first aspect of the present invention.

Preferably the baler includes a twine reservoir and a knotter, in which the twine tension monitoring portion is located to a first side of the knotter and the signalling portion is mechanically actuated and located to a second side of the knotter.

BRIEF DESCRIPTION OF THE SEVERAL VIEWS OF THE DRAWINGS

The invention will now be described, by way of example only, with reference to the accompanying drawings, in which.

DETAILED DESCRIPTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
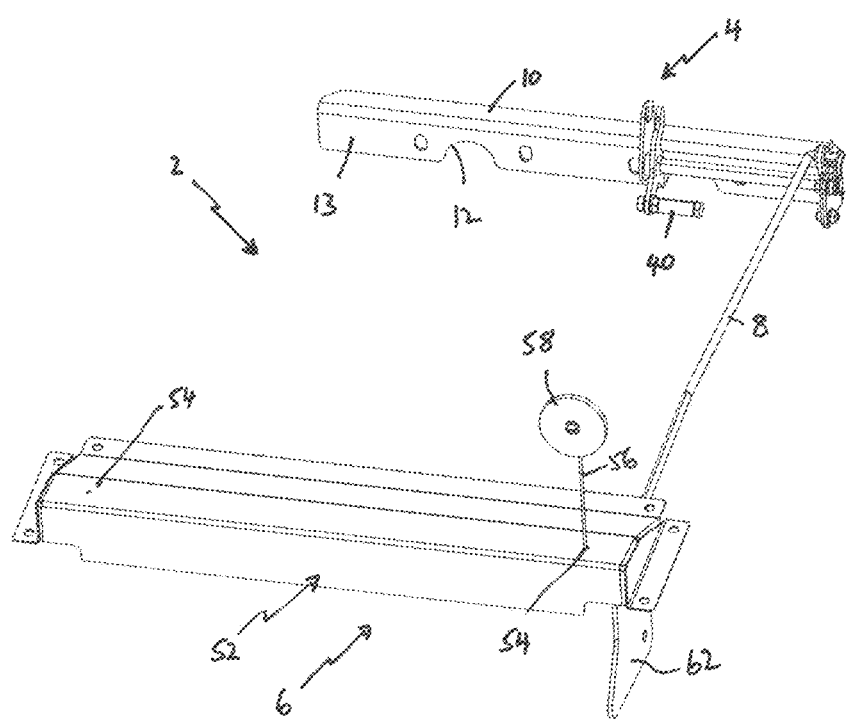
FIG. 1 shows a perspective view of a twine tension monitoring apparatus.
Figure 6:
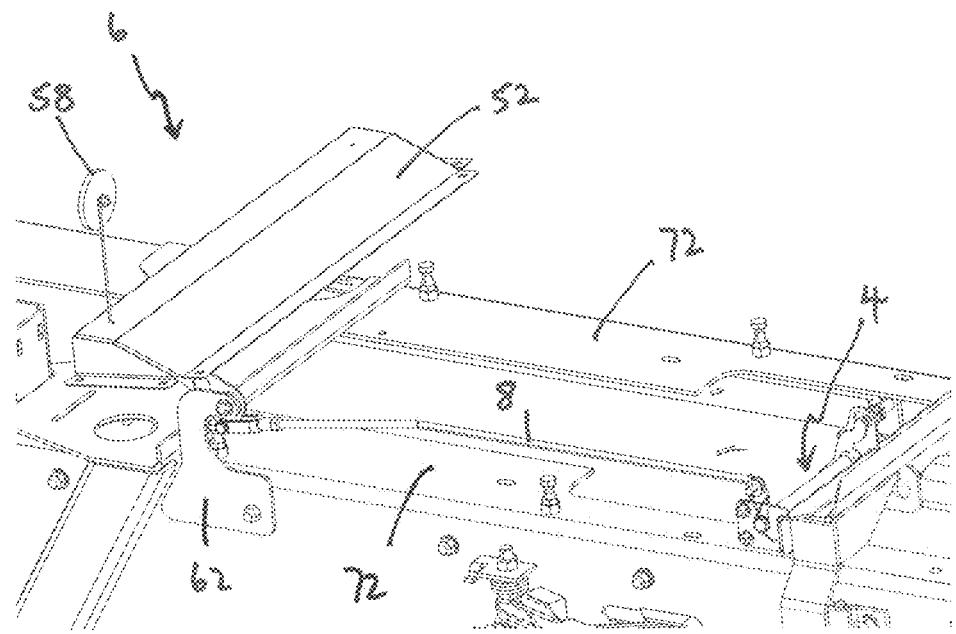
FIG. 6 shows a perspective view of the twine tension monitoring apparatus of FIG. 1 in position on a frame of a baler.
Figure 7:
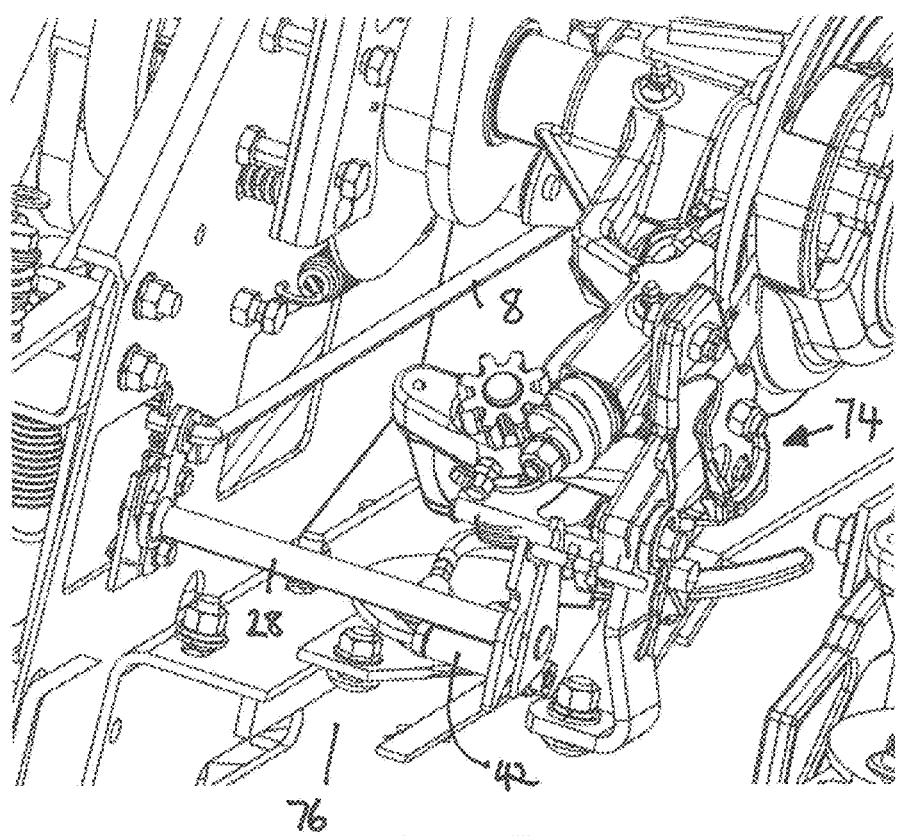
FIG. 7 shows a perspective view of elements of a baler in the region of a knotting apparatus.
Figure 13:
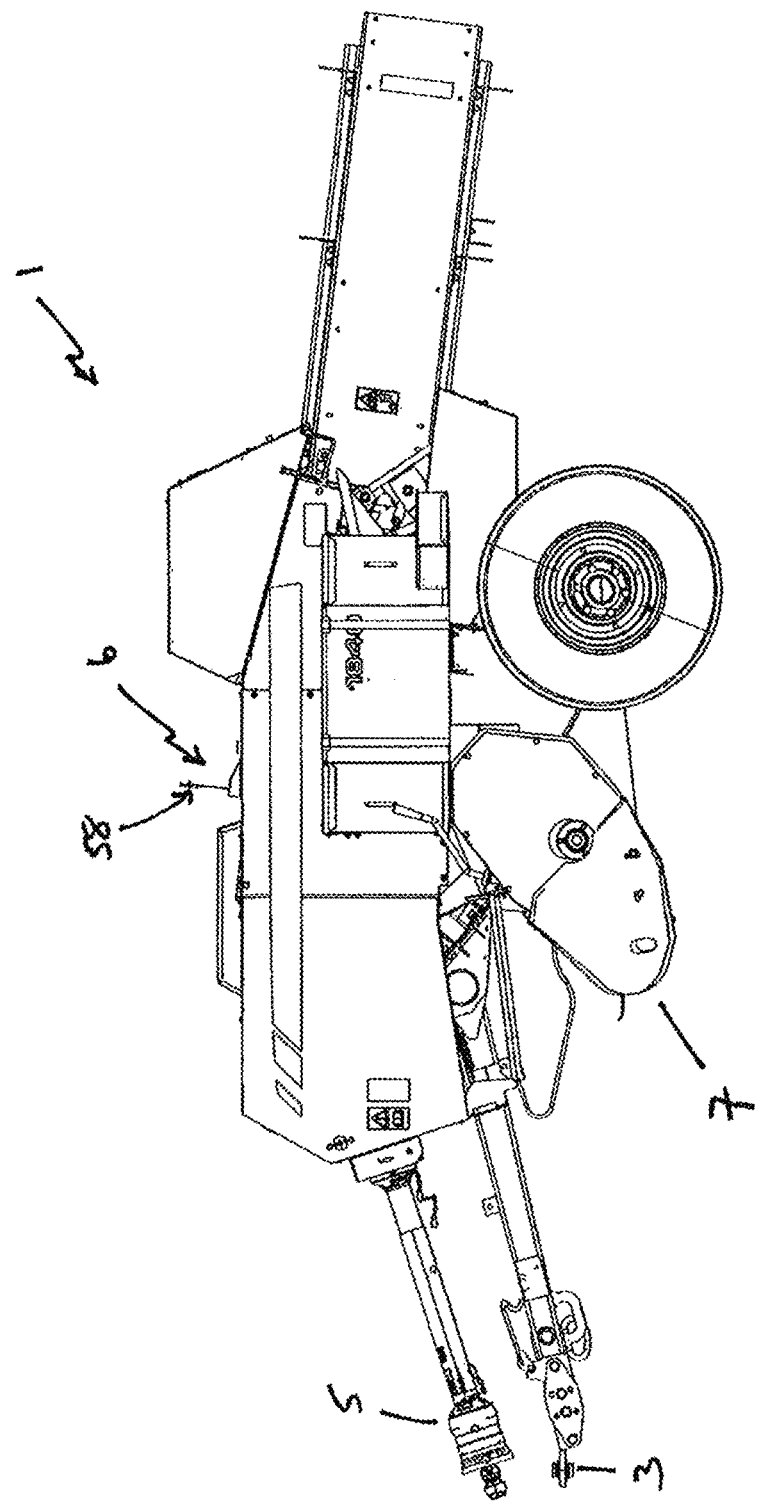
FIG. 13 shows a side view of an agricultural baler incorporating a twine tension monitoring apparatus according to the first aspect of the invention.

With reference to FIG. 1, a twine tension monitoring apparatus 2 is shown. In practice the twine tension monitoring apparatus 2 may be mounted on a baler 1 of the kind commonly referred to as a small square baler (FIGS. 6, 7 and 13). References to 'upper' or 'lower' or similar directional references should be understood by reference to such a baler located on a level surface. References to 'inner' or 'outer' should be understood by reference to a central longitudinal axis of such a baler.

A single twine monitoring apparatus 2 will be described, save where the context makes clear that the principles may be applied to a baler having two or more knotters.

In the illustrated embodiment of FIGS. 1 to 7, the twine tension monitoring apparatus 2 includes a tension monitoring portion 4 and a mechanical signaling portion 6 joined to one another by a connecting element 8. Where a baler has two or more knotters, a separate twine tension monitoring apparatus 2 is provided for each knotter.

Figure 2:
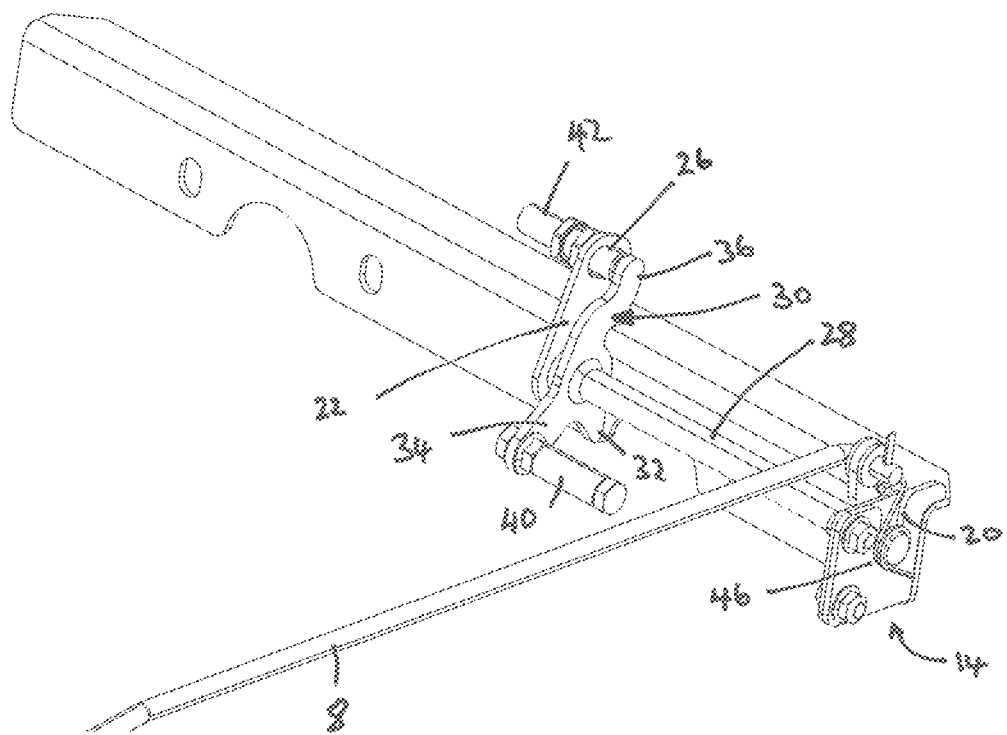
FIG. 2 shows a first perspective view of a first end of the twine tension monitoring apparatus of FIG. 1.
Figure 3:
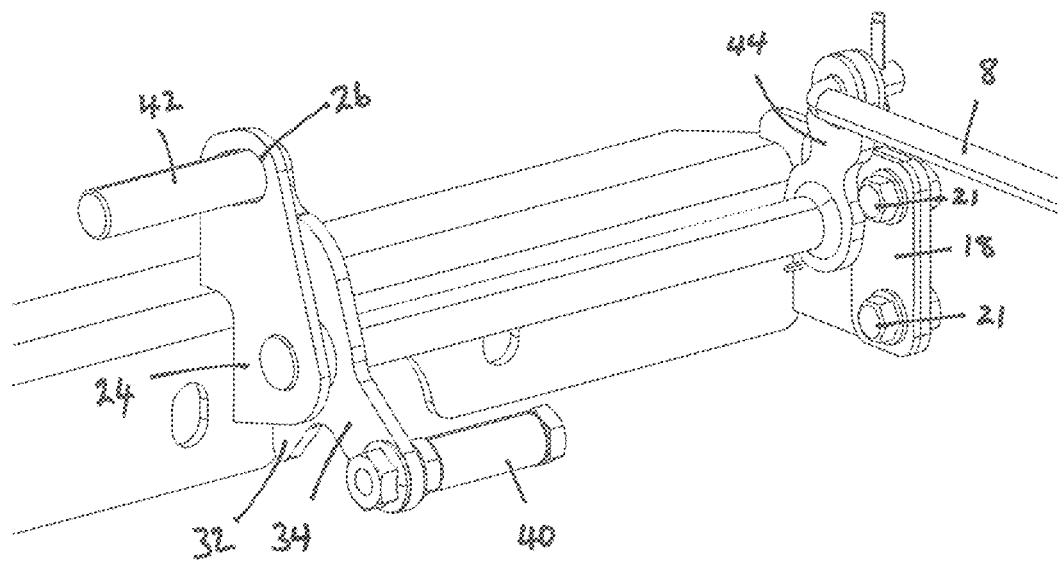
FIG. 3 shows a further perspective view of the first end of the twine tension monitoring apparatus of FIG. 1.
Figure 4:
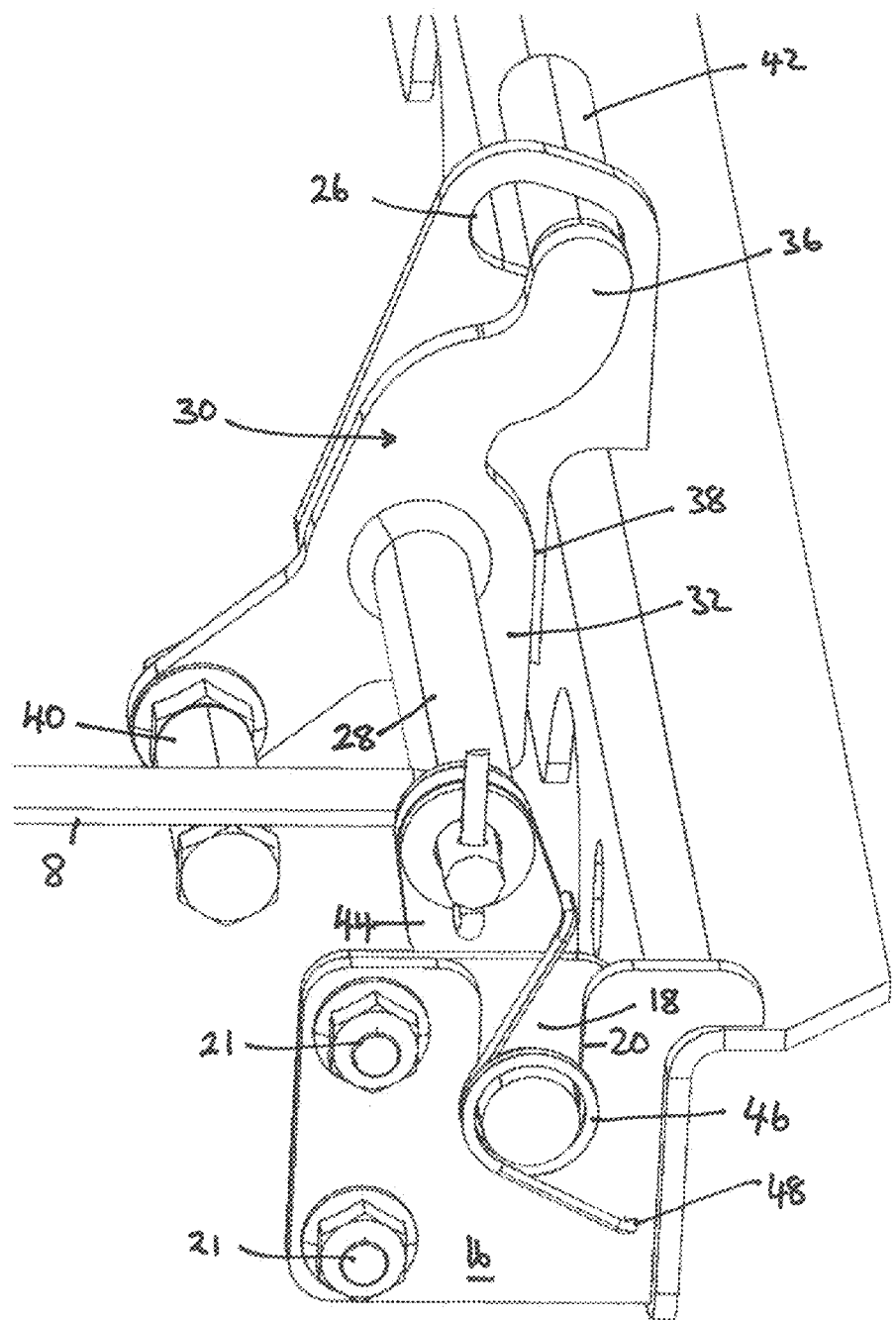
FIG. 4 shows a further perspective view of the first end of the twine tension monitoring apparatus of FIG. 1.

An example tension monitoring portion 4 is shown in more detail in FIGS. 2, 3 and 4.

A support housing 10 is provided for mounting on a frame of a baler 1. In practice, the support housing 10 is mounted to extend laterally across the frame of the baler 1 and in particular across a baling chamber of the baler 1. In the illustrated embodiment, the support housing 10 is substantially L-shaped in section and includes a depending portion 13 provided with a cutaway portion 12 in order to allow passage of a strand of a binding material through the support housing 10. In the illustrated embodiment, the cutaway portion 12 is of substantially semi-circular form.

An outer side plate arrangement 14 is provided at one end of the support housing 10. The outer side plate arrangement 14 comprises an outer plate 16 and an inner plate 18. The outer plate 16 is permanently secured to the support housing 10 along at least one edge. Conveniently the outer plate 16 is welded to the support housing 10. An upper edge of outer plate 16 includes a substantially U-shaped cutout 20.

The inner plate 18 is substantially L-shaped. The inner plate 18 is releasably secured to the outer plate 16 by way of fasteners 21 extending through the outer plate 16 and the inner plate 18. The inner plate 18 is provided with an arcuate surface on an inner edge of a horizontally extending limb.

Located inwardly of the outer side plate arrangement 14 is an inner side plate 22. The inner side plate 22 is permanently secured to the support housing 10 along at least one edge. Conveniently the inner side plate 22 is welded to the support housing 10. The inner side plate 22 is provided with a circular opening 24 in a lower portion thereof and an elongate arcuate window 26 located in an upper region thereof.

A first end of a pivoting shaft 28 is located within the circular opening 24. A second end of the shaft 28 is located in the lower end of the U-shaped window 20 of the outer plate 16. With the inner plate 18 in place, it can be seen that the lower end of the U-shaped window 20 and the arcuate surface of the inner plate 18 define a circular mounting for the second end of the shaft 28.

The shaft 28 is provided with a first armature 30 located towards the first end of the shaft 28. The first armature 30 is fixed in relation to the shaft 28, such that movement of the first armature 30 causes pivoting of the shaft 28 about a central axis of the shaft 28. The first armature 30 is provided with first, second and third radially extending portions 32, 34 and 36.

The first radially extending portion 32 extends downwardly adjacent to the depending portion 13 of the support housing 10 and includes an abutment surface 38. The first radially extending portion 32 acts as a lower limit stop for the tension monitoring portion 4.

The second radially extending portion 34 extends downwardly away from the support housing 10. A distal end of the second radially extending portion 34 includes an opening through which a first end of a first laterally extending finger 40 is secured. The laterally extending finger 40 can be seen to extend in a first direction across a width of the adjacent cutaway 12.

The third radially extending portion 36 extends upwardly from the shaft 28. A distal end of the third radially extending portion 36 includes an opening through which a first end of a second laterally extending finger 42 is secured. The second laterally extending finger 42 can be seen to extend in a second direction, opposite to the first direction of the first laterally extending finger 40. The second laterally extending finger 42 is arranged to extend through the elongate arcuate window 26.

In the illustrated embodiment, the shaft 28 is provided with a second armature 44 located towards the second end of the shaft 28. The second armature 44 is fixed in relation to the shaft 28, such that pivoting of the shaft 28 causes movement of the second armature 44.

A biasing element is conveniently provided at the second end of the shaft 28. In the illustrated embodiment, the biasing element takes the form of a helical torsion spring 46 mounted on the second end of the shaft 28. A first end 48 of the helical torsion spring 46 is secured in a suitable opening provided in the outer plate 16. A second end 50 of the helical torsion spring 46 extends over the inner plate 18 of the outer side plate arrangement 14 and abuts an upper end of the second armature 44 on a side of the second armature 44 adjacent the support housing 10. Conveniently other biasing elements, for example an extension spring, may be considered.

In practice this has the effect of urging the first armature 30 away from the position shown in FIGS. 2, 3 and 4. The biasing element may be omitted, the center of gravity of the tension monitoring portion 2 being such as to cause the movement of the first armature 30 toward the position shown in FIGS. 2,3 and 4 to occur naturally. However, due to the vibration experienced during operation of the baler, the presence of the biasing element is preferred.

A first end of the connecting element 8 is connected to an upper end of the second armature 44.

Figure 5:
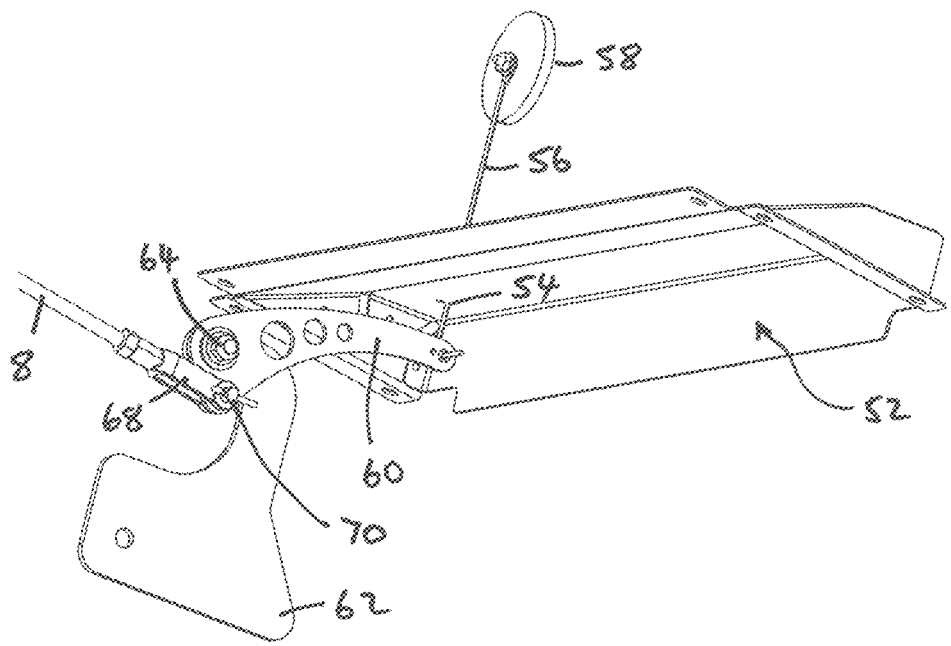
FIG. 5 shows a perspective view of a second end of the twine tension monitoring apparatus of FIG. 1.

An example mechanical signaling portion 6 is shown in more detail in FIG. 5. The signaling portion 6 may be located in any suitable location on the baler, for example behind an associated knotter unit 70. The signaling portion 6 conveniently includes a cover portion 52 for mounting to the baler. The cover portion 52 includes an opening 54 though which a shaft 56 of a flag 58 extends. A lower end of the shaft 56 is connected to a first end of an arcuate lever 60. A second end of the arcuate lever 60 is mounted by way of a pivot pin 64 to a support plate 62. The support plate 62 is conveniently secured to the frame of the baler.

A clevis joint 68 provided at a second end of the connecting element 8 is connected by a pivot pin 70 to the second end of the arcuate lever 60. In this way movement of the second arcuate member 44 will be communicated by the connecting element 8 to the arcuate lever 60 causing the arcuate lever 60 to pivot about pivot pin 64 and so cause movement of the flag 58.

The twine tensioning apparatus disclosed is particularly suited for use with a baler of the kind known as a small square baler (FIG. 13). The baler 1 is designed to be towed by an agricultural vehicle such as a tractor by way of a hitch 3. Operation of the baler 1 is driven by way of a Power Take Off (PTO) connection 5 to the PTO of the agricultural vehicle. Cut crop is taken from the ground by a pick-up mechanism 7 and charges of the lifted crop delivered to a baling chamber where the lifted crop is compressed under the action of a reciprocating piston to form a flake. Subsequent flakes are compressed together and pushed along the baling chamber until a bale of the desired size is formed. Once a bale of a desired size has been formed a knotter is actuated to tie off strands of twine. Paired sets of upper and lower strands of twine are provided across the width of the forming bale. The lower strands start from a knot tied at an upper leading edge of the formed bale, extend down the leading face of the formed bale and extend beneath a lower surface of the forming bale. Each strand of twine is drawn from a reservoir as the bale is formed and the lead flake progresses along the baling chamber. Each set of twine strands is associated with a corresponding knotting apparatus comprising a knotter above the baling chamber and a needle arm adapted to draw the lower twine strand around the trailing end of the bale to the knotter where the lower and upper twine strands are knotted together before the tied and formed bale is cut from the strands of twine and a subsequent bale forming process is begun.

In the embodiment shown in FIGS. 6 and 7, the tension monitoring portion 4 is fitted to an upper part of the baler frame 72 above the baling chamber between the knotter apparatus and the openings 76 through which the needle arms of the knotter apparatus will extend in use to raise a lower portion of the binding twine towards the knotter 74. Conveniently, the tension monitoring portion 4 is fitted adjacent the openings 76. The mechanical signaling portion 6 is located to the other side of the knotter.

In FIG. 6 the knotter 74 has been omitted for reasons of clarity. It can be seen that the in the absence of a strand of twine raising the first laterally extending finger 40 (as discussed below), the first laterally extending finger 40 will extend through the openings 76 to ride on an upper surface of the forming bale. Additionally, in the absence of tension causing the first laterally extending finger 40 to be raised, the first radially extending portion 32 acts as a lower limit stop to prevent the first laterally extending finger 40 extending too far within the baling chamber such that it might be damaged by the reciprocating plunger during initial bale formation, where the forming bale has not yet presented an upper surface on which the first laterally extending finger 40 may ride.

Figure 11:
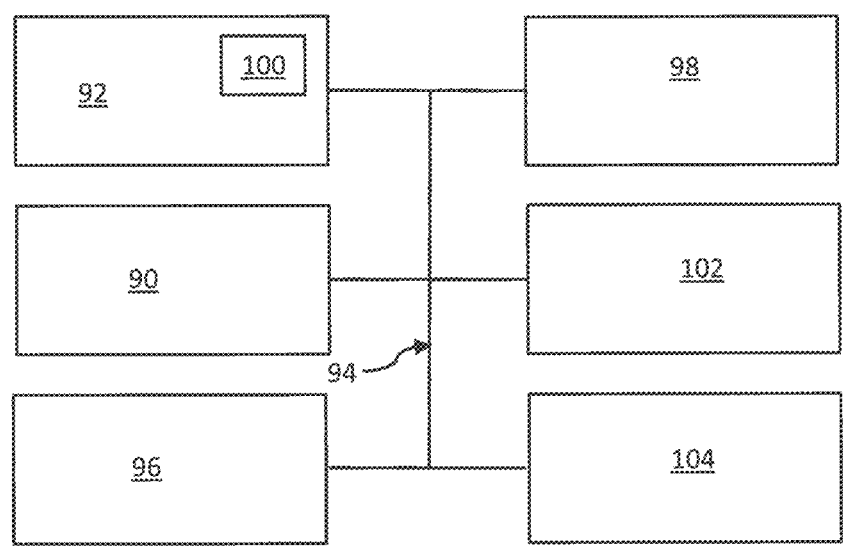
FIG. 11 shows schematically electrical elements of a system for use with the twine tension monitoring apparatus of the invention.

The second laterally extending finger 42 may also conveniently serve as a mounting for an electrical sensor 90 (FIG. 11), such as a proximity switch, forming part of an electrical signaling portion to be utilized instead of, or in addition to, the mechanical signaling portion.

The electrical sensor 90 may use to signal an electronic control unit 92 to indicate whether the tension monitoring portion 4 is in the first or the second position. It will be understood that a variety of electrical sensors may be used to achieve this result, for example a potentiometer may be used to determine a rotational position of the shaft 28 and so the position of the first laterally extending finger 40.

If used in addition to the mechanical signaling portion, the electrical sensor 90 may be provided as a switch mechanically actuated by the flag 58 or the connecting element 8 or as a sensor monitoring the position of the flag.

The electronic control unit 92 is also in electronic or other communication with various components and devices of the baler (and/or the towing vehicle). Conveniently such communication may be enabled by way of a suitable data communication network 94 such as one compliant with the ISOBUS standard (a network in conformance to ISO 11783). For example, the electronic control unit 92 may be in electronic communication with various actuators, sensors, and other devices within (or outside of) the baler. The electronic control unit 92 may communicate with various other components (including other controllers) in various known ways, including wirelessly. Examples of such sensors include a bale progression sensor 96 and a knot tying sensor 98.

Various alternative locations for the electronic control unit 92 may be utilized, including locations on the towing vehicle. It will be understood that one or more electronic control units may be employed and that the electronic control unit(s) 92 may be mounted at various locations on the towing vehicle, baler, or elsewhere. The electronic control unit(s) may be a hardware, software, or hardware and software computing device, and may be configured to execute various computational and control functionality with respect to the baler (or towing vehicle).

The electronic control unit 92 is also able to access a suitable memory 100. The memory 100 may take any suitable form and is in electronic communication with the electronic control unit 92. The memory 100 is adapted to store, in any suitable manner such as a database or look up table, reference values for a desired parameter.

A user terminal 102 communicates with an electronic control unit 92. The user terminal 102 is conveniently located within a cab of the towing vehicle and allows a Human Machine Interface (HMI) with an operator.

Figure 8:
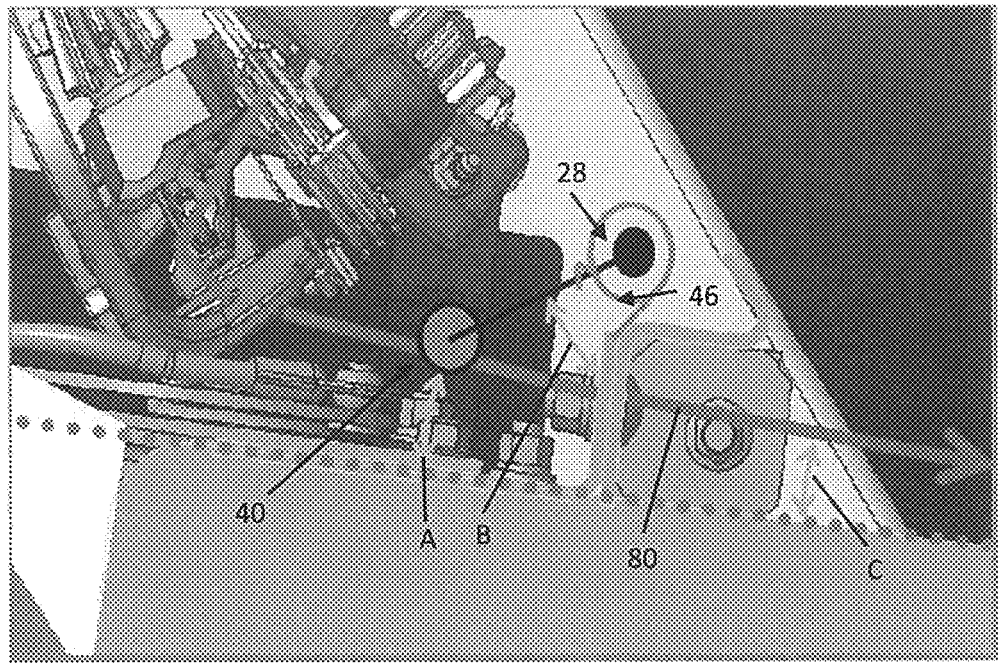
FIG. 8 shows a side view of the twine tension monitoring apparatus in which a twine is properly tensioned to indicate a successfully tied knot with baler progression.
Figure 9:
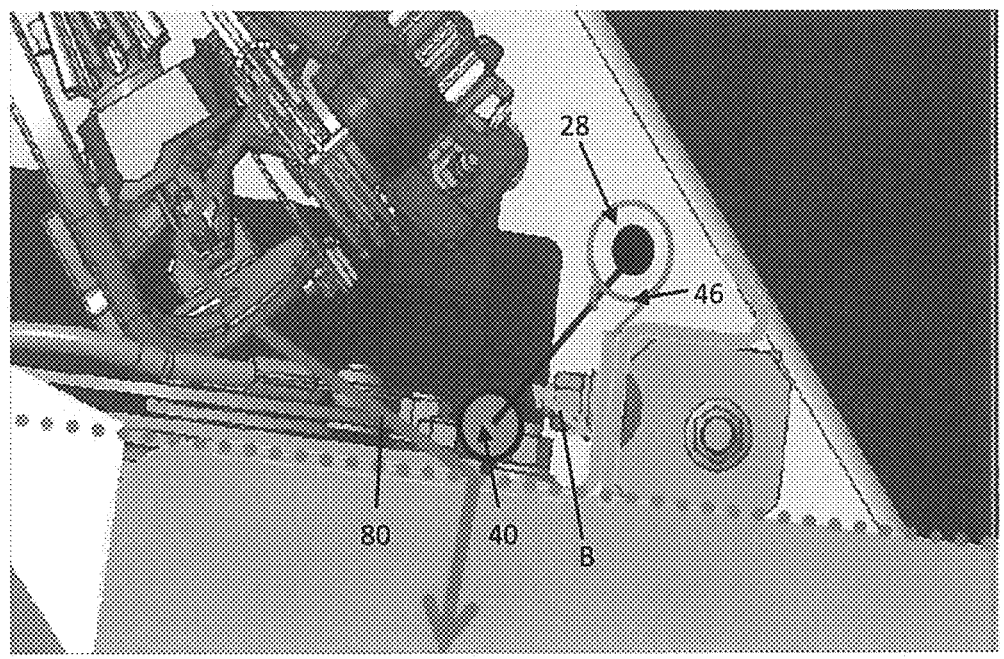
FIG. 9 shows a side view similar to FIG. 8 in which the twine is properly tensioned, but in which minor bale progression has occurred following a successful knot tying event.
Figure 10:
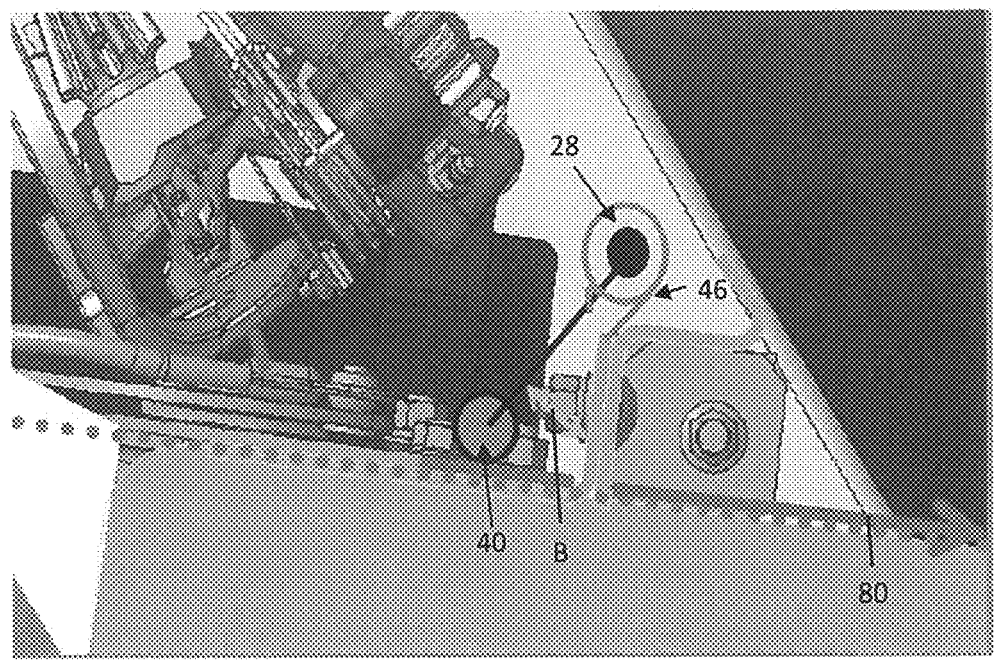
FIG. 10 shows a side view similar to FIG. 8 in which the twine has broken.

FIGS. 8, 9 and 10 show a schematic side view of the tension monitoring portion 4 in which a strand of twine is shown in relation to elements of the tension monitoring portion 4 in various operating conditions.

In FIG. 8, a bale has substantially been formed. The strand 80 of twine extends from the knotter apparatus beneath the first laterally extending finger 40, through the cutaway portion 12 of the support housing 10 and towards a leading front face of the bale being formed in the baling chamber of the baler. In this position the strand 80 of twine is spaced from the upper part of the baler frame 72 (arrows A and C). The strand 80 of twine acts on the first laterally extending finger 40 to pivot the shaft 28 against the action of the torsion spring 28 such that the elements of the tension monitoring portion 4 have moved to the second position shown in FIGS. 1 to 7 (and so causes the signaling portion 6 to adopt the position shown in FIGS. 1, 5 and 6). Arrow B indicates the arcuate movement of the first laterally extending finger 40 about the horizontally extending longitudinal axis of the shaft 28.

FIG. 9 shows a similar view, but where although the twine is properly tensioned following a successful knot tying event, the twine is properly tensioned, but in which only minor bale progression has occurred. The end of the strand 80 can be seen following down a leading edge of the forming bale. The strand 80 has yet to contact the first laterally extending finger 40 and so the shaft has pivoted (arrow B) under the action of the torsion spring 46 to lower the first laterally extending finger 40 and by way of the connecting element 8 to actuate the signaling portion that there has been an expected loss of tension following the knot tying event.

FIG. 10 shows a similar view in which the strand 80 has broken leading to a loss of tension, but in which bale progression has continued drawing a portion of the twine along with the leading edge of the forming bale (exaggerated to illustrate the principle). Where a knot is successfully tied, the tine is held by the disc and holder of the knotter after knot is formed, such that the twine is always held off the bale closest to the knotter creating the angle shown in FIG. 8. In the event of a mistie, the twine will not have the tension to create this angle resulting in a similar loss of tension. In this Figure the strand 80 is unable to contact the first laterally extending finger 40 to pivot the shaft back to the position shown in FIG. 8 and so the shaft 28 remains pivoted (arrow B) under the action of the torsion spring 46 and the signaling portion continues to indicate that there has been a loss of tension following the knot tying event.

Balers are provided with a detection apparatus 96 for monitoring the advancement of the formed bale, in particular to determine when a bale has been sufficiently formed to trigger a knot tying event. Input from such a detection apparatus 96 can be used to determine whether a suitable tension signal has been triggered by the tension monitoring portion 4 following a predetermined amount of bale advancement.

For example, when utilizing the mechanical signaling portion if an operator does not see a flag 58 in the correct position following a predetermined degree of filling of the baling chamber, it will be understood that there is a problem and the operator can cease baling and take appropriate remedial action. Similarly a lack of expected movement of the flag 58 following a tie cycle will be understood to indicate a problem.

Alternatively, or additionally, the signaling apparatus may trigger an electrical signal to the electronic control unit 92 when the first laterally extending finger 40 is in a predetermined position, the presence or absence of such a signal together with a signal from the bale advancement detection apparatus 96 indicating advancement to a position where the tension monitoring position should be detecting tension causing a further signal or signals to be generated, for example to cause the electronic control unit 92 to signal to the operator within a towing vehicle by way of the human machine interface (HMI) 102 that an error condition has been sensed and operation of the baler should be ceased or to generate signals to cease operation of the baler—for example by causing the reciprocating plunger 104 to cease operation—and also to signal to the operator that baling has been ceased and the reason for ceasing operation of the baler.

In an alternative embodiment, the signaling apparatus may generate a signal to the electronic control unit to indicate any low tension situation (whether a potential mistie and immediately following a knot tying event). The electronic control unit 92 can receive signals from other parts of the baler, for example to indicate when a tie cycle has occurred from sensor 98 or when a predetermined number of flakes have been formed following a tying event and use such signals to filter out expected low tension circumstances from unexpected low tension circumstances, for example by way of suitable look up tables, executing suitable preprogramed algorithms or otherwise.

Figure 12:
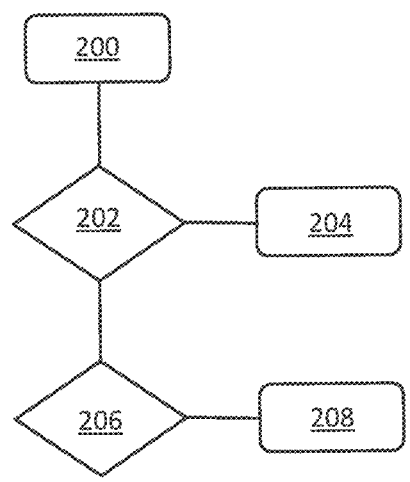
FIG. 12 shows a flow diagram illustrating operation of the twine tension monitoring apparatus.

An example flow chart of a method of operation of a suitable control system is shown in FIG. 12. A knot tying command is issued by the electronic control unit 92 (step 200). The electronic control unit 92 subsequently receives a signal from the electrical sensor 90 and determines whether the signal is representative of the first laterally extending finger 40 being in the first position (as expected) (step 202). If the signal indicates that the first laterally extending finger 40 is in the first position the electronic control unit 92 takes no further action in response to this signal and continues to monitor the signals received from the electrical sensor 90. If the signal indicates that the first laterally extending finger 40 is not in the first position or is in the second position the electronic control unit 92 signals an error condition (step 204), for example by signaling the HMI 102 to indicate an error condition requiring investigation by an operator, and optionally also causing the baler to cease operation.

Once a predetermined threshold condition has been determined or detected (for example a given period of time has lapsed since the knot tying command has been issued or it has been detected that the forming bale has advanced a predetermined distance) the signal from the electrical sensor 90 is reviewed by the electronic control unit is reviewed and the electronic control unit determines whether the signal is representative of the first laterally extending finger 40 being in the second position (as expected) (step 206). If the signal indicates that the first laterally extending finger 40 is in the second position the electronic control unit 92 takes no further action in response to this signal and continues to monitor the signals received from the electrical sensor 90. If the signal indicates that the first laterally extending finger 40 is not in the second position the electronic control unit 92 signals an error condition (step 208), for example by signaling the HMI 102 to indicate an error condition requiring investigation by an operator, and optionally also causing the baler to cease operation.

This process will be repeated following every knot tying command.

The electronic control unit 92 will typically not take action on receipt of a single signal from the electrical sensor but "smooth" the results to avoid a falsely indicating an error condition, for example caused by "dancing" of the first laterally extending finger 40 on the surface of the bale for example due to vibration caused by operation of the baler or by advancing of the formed bale.

It will be understood that where the electrical sensor 90 is able to determine the angle of rotation of the shaft and accordingly the angular position of the first laterally extending finger 40 as the strand 80 is raised during initial advancement of the forming bale, the control system may be modified to determine the anticipated angular position of the first laterally extending finger 40 and for the electronic control unit 92 to indicate an error condition where the strand 80 has not been raised as anticipated.

It will be appreciated that the disclosed twine tension monitoring apparatus 2 may be retrofitted to a baler.

Figure 14:
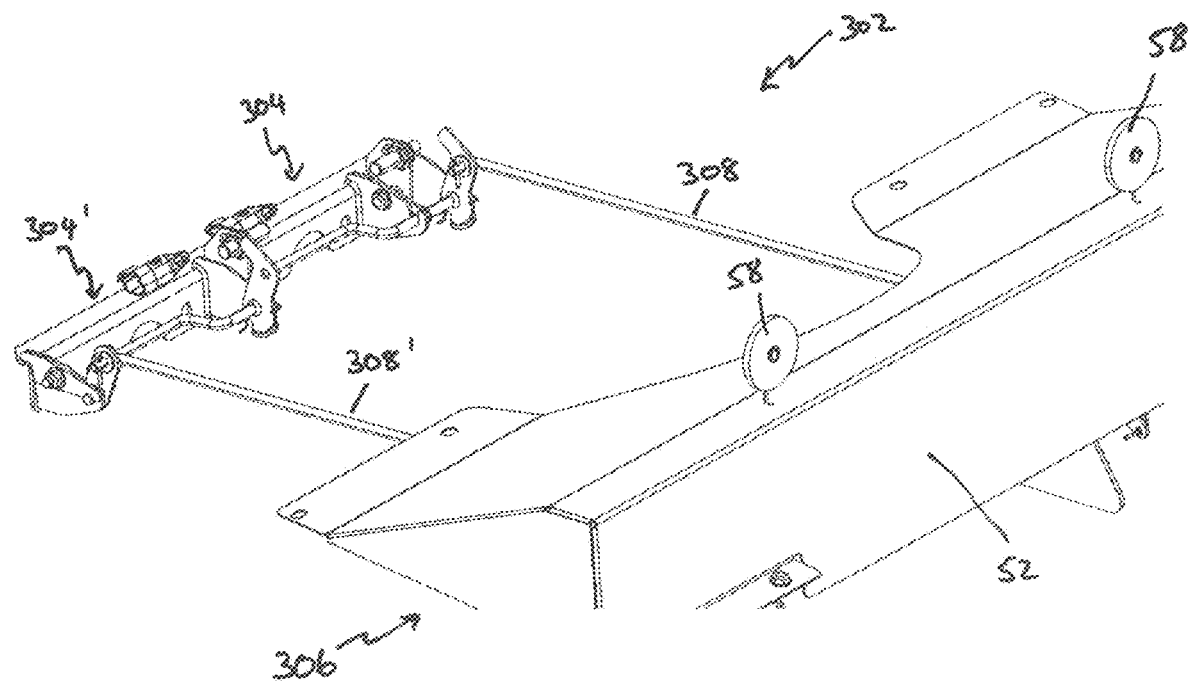
FIG. 14 shows a perspective view of a second twine tension monitoring apparatus.
Figure 15:
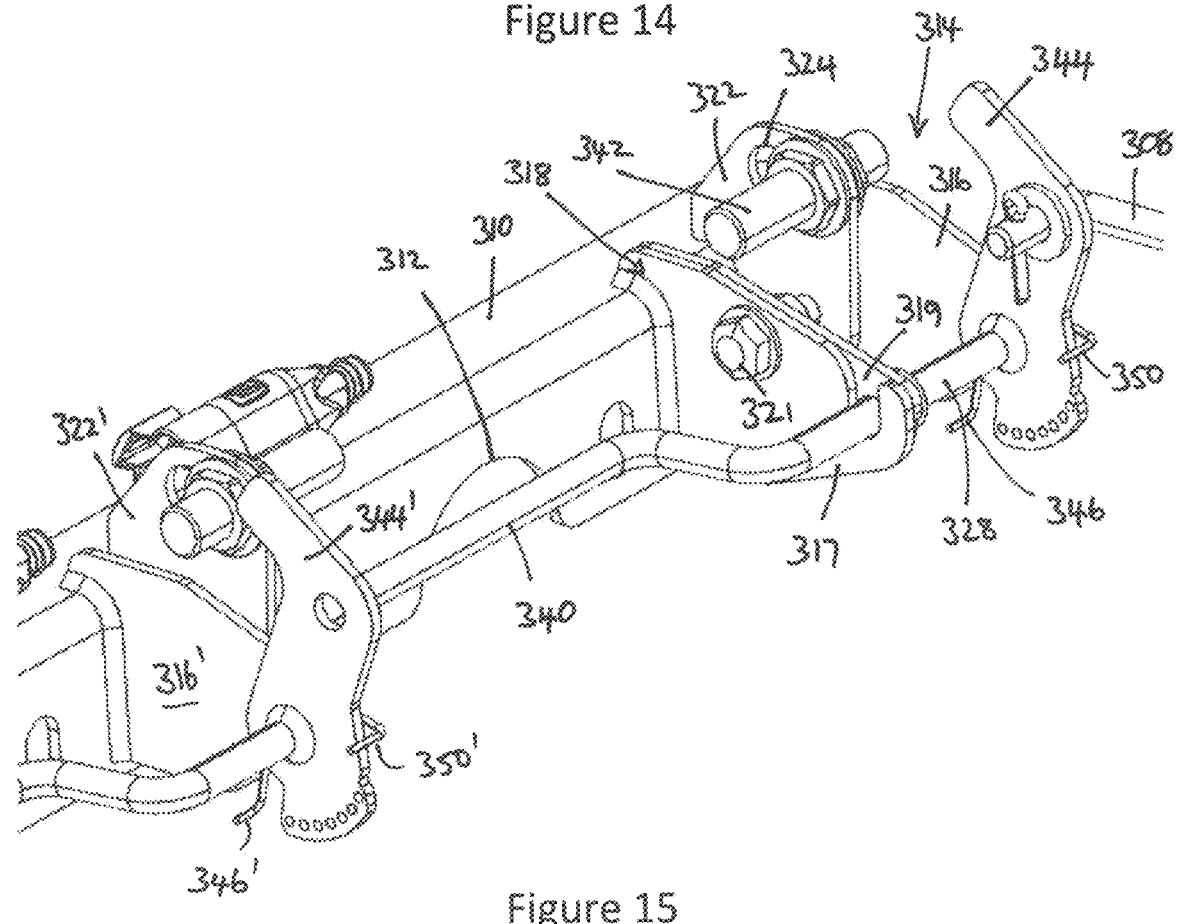
FIG. 15 shows a first perspective view of a first end of the twine tension monitoring apparatus of FIG. 14.
Figure 16:
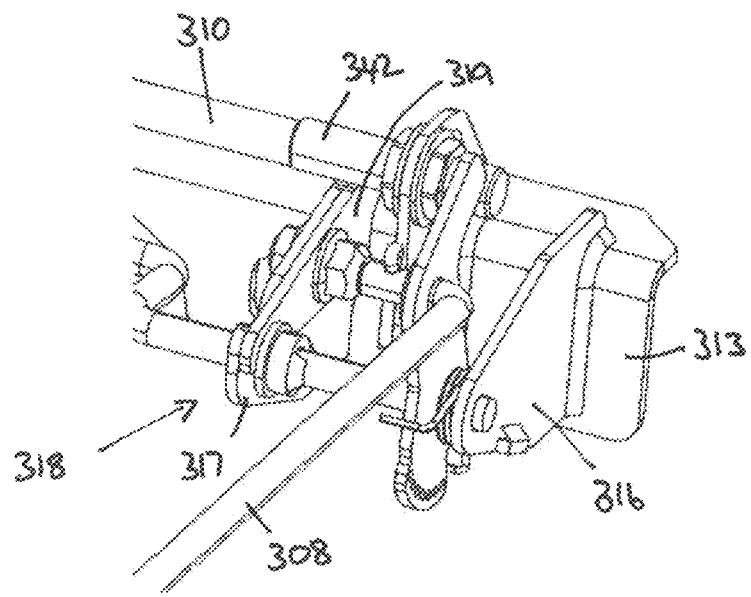
FIG. 16 shows a second perspective view of the first end of the twine tension monitoring apparatus of FIG. 14.
Figure 17:
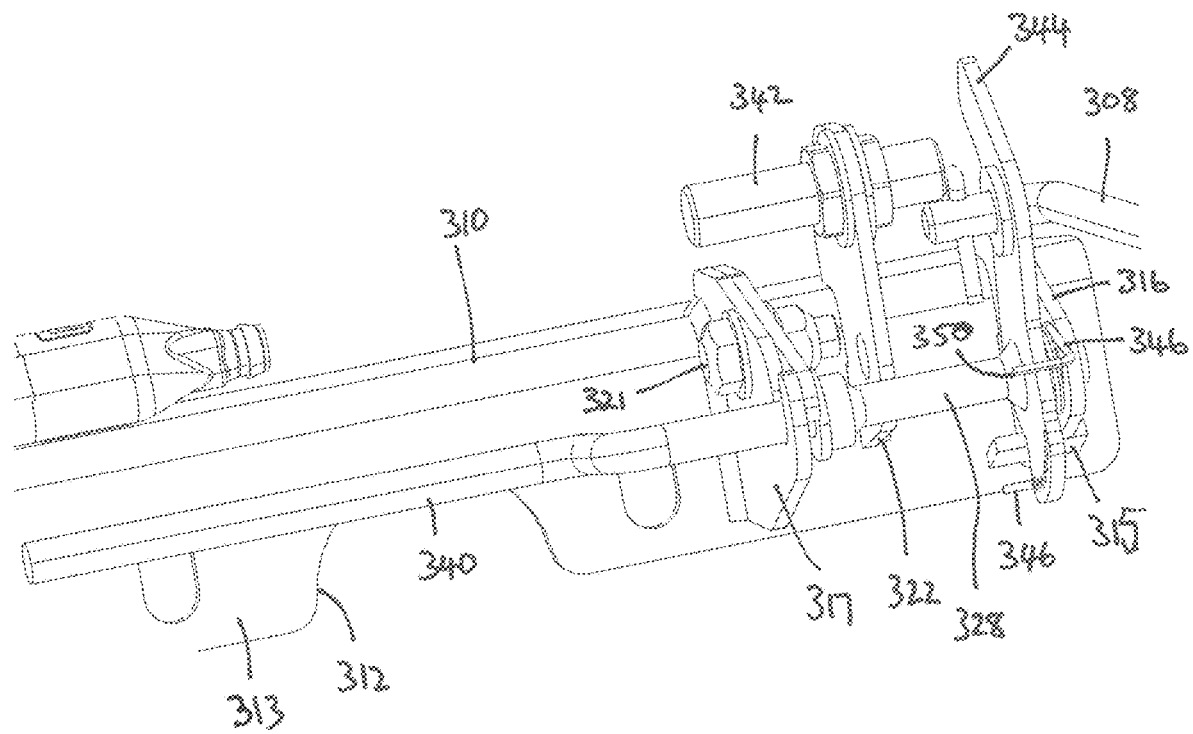
FIG. 17 shows a third perspective view of the first end of the twine tension monitoring apparatus of FIG. 14.

A further twine tension monitoring apparatus 302 is shown in FIGS. 14 to 16 incorporating a modified twine tension monitoring portions 304,304'. In FIG. 14 two separate twine tension monitoring potions 304,304' are shown, one to each side of the support housing 310. Each is connected to a mechanical signaling portion 306 by a connecting element 308. The mechanical signaling portion 306 may take the form of the mechanical signaling portion 6 of the earlier embodiment.

The twine tension monitoring portion 304 to the right of FIG. 14 will be described in more detail. It is understood that the twine tension monitoring portion 304 to the left is substantially similar that on the right and so is not described again in detail. The twine tension monitoring portion 304 includes a support housing 310 provided for mounting on a frame of a baler 1. In practice, the support housing 310 is mounted to extend laterally across the frame of the baler 1.

In the illustrated embodiment of FIGS. 14,15, 16 and 17, the support housing 310 is substantially L-shaped in section and includes a depending portion 313 provided with a cutaway portion 312 in order to allow passage of a strand of a binding material through the support housing 310. In the illustrated embodiment, the cutaway portion 312 is of substantially semi-circular form.

An outer side plate arrangement 314 is provided at one end of the support housing 310. The outer side plate arrangement 314 comprises a first plate 316 and a second set of plates 318. The first plate 316 is permanently secured to the support housing 10 along at least one edge. Conveniently the first plate 316 is welded to the support housing 10. A distal end of the first plate 316 includes an opening. The lower portion of the first plate is also provided with a stop 315 which extends laterally inwards.

The second set of plates 318 includes a lower plate 317 and an upper plate 319. The lower plate 317 is permanently secured to the support housing 310 along at least one edge. Conveniently the lower plate 317 is welded to the support housing 10. A distal end of the lower plate includes a substantially U-shaped recess in an upper portion thereof. The upper plate 319 is releasably secured to the lower plate 317 by way of a fastener 321 extending through upper plate 319 is releasably secured to the lower plate 317. The upper plate is provided with a substantially U-shaped recess in a lower portion thereof. When the upper plate 319 is secured to the lower plate 317, the respective U-shaped recesses form an opening through the second set of plates 318.

Located between the outer side plate arrangement 314 and the second set of plates 318 is an intermediate plate 322. The intermediate plate 322 is permanently secured to the support housing 310 along at least one edge. Conveniently the intermediate plate 322 is welded to the support housing 310. The intermediate plate 322 is provided with an arcuate elongate opening 324 in an upper region thereof through which a laterally extending finger 342 may be conveniently secured in a desired manner into a desired position. The laterally extending finger 342 may also conveniently serve as a mounting for an electrical sensor 90 (FIG. 11), such as a proximity switch, forming part of an electrical signaling portion to be utilized instead of, or in addition to, the mechanical signaling portion.

A first end of a shaft 328 is mounted for rotation within the circular opening in the first plate 316. The shaft 328 extends through and is supported by the opening defined by the second set of plates 318. The shaft 328 comprises three portions a first portion extending from the first plate 316 and through the opening defined by the second set of plates 318, a second portion extending normally to the first portion, and a third portion 340 extending normally to the second and substantially parallel to the first portion. The third portion 340 can be seen to extend in a first direction across a width of the adjacent cutaway 312 in the support housing 310.

The first portion of the shaft 28 is provided with an armature 344 located towards the first end of the shaft 28. The armature 344 is fixed in relation to the shaft 328, such that pivoting of the shaft 328 causes movement of the armature 344.

A biasing element is conveniently provided on the first portion of the shaft adjacent the first plate 316. In the illustrated embodiment, the biasing element takes the form of a helical torsion spring 346 mounted on the shaft 28. A first end 348 of the helical torsion spring 346 is adapted to extend between with the stop 315 provided the first plate 316 and a first surface of the armature 344. A second end 350 of the helical torsion spring 346 extends behind a second surface of the armature 344. Conveniently other biasing elements may be considered.

The biasing element acts to limit the travel of the armature 344 and by extension the rotation of the third portion of the shaft 328 about an axis defined by the first portion of the shaft 328. In this way, the third portion 340 of the shaft is prevented from extending too far within the baling chamber such that it might be damaged by the reciprocating plunger during initial bale formation, where the forming bale has not yet presented an upper surface on which the third portion 340 of the shaft may ride.

A first end of the connecting element 308 is connected to an upper end of the armature 344.

The second embodiment will be understood to operate in a manner similar to the first. As a bale is being formed, a strand of twine extends from the knotter 74, through the cutaway portion 312 in the support housing 310, beneath the third portion 340 of the shaft 328 and towards a leading front face of the bale being formed in the baling chamber of the baler 1.

Following a successful knotter operation, the third portion 34' of the shaft 328 is no longer supported and shaft 328 has rotates due to the action of the biasing means. As a result, the armature 344 is moved to cause the connecting element 308 to mechanically actuate the mechanical signaling portion of the twine tension monitoring apparatus 302 such that the flag 58 is moved.

In the event of a successful tie the strand of twine will be raised and the flag moved again as the shaft 328 is caused to pivot. In the absence of a successful tie the flag will not be returned to its previous position and so indicate a continued loss of tension.

Figure 18:
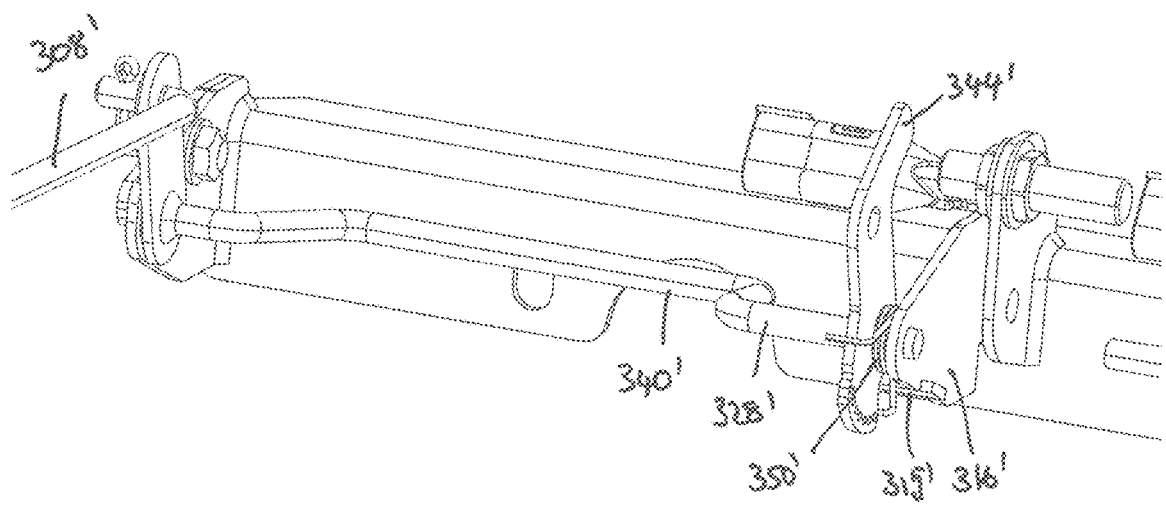
FIG. 18 shows a more detailed perspective view of the twine tension monitoring portion of FIG. 14.

The twine tension monitoring portion 304' to the left of FIG. 14 is constructed in much the same way as that to the right, save for the construction of shaft 328' (FIG. 18). A first plate 316' is permanently secured to a central region of the support housing 10 along at least one edge. A distal end of the first plate 316' includes an opening in which a first end of the shaft 328' is rotatably mounted and a lower surface is provided with a laterally directed stop 315'.

Figure 19:
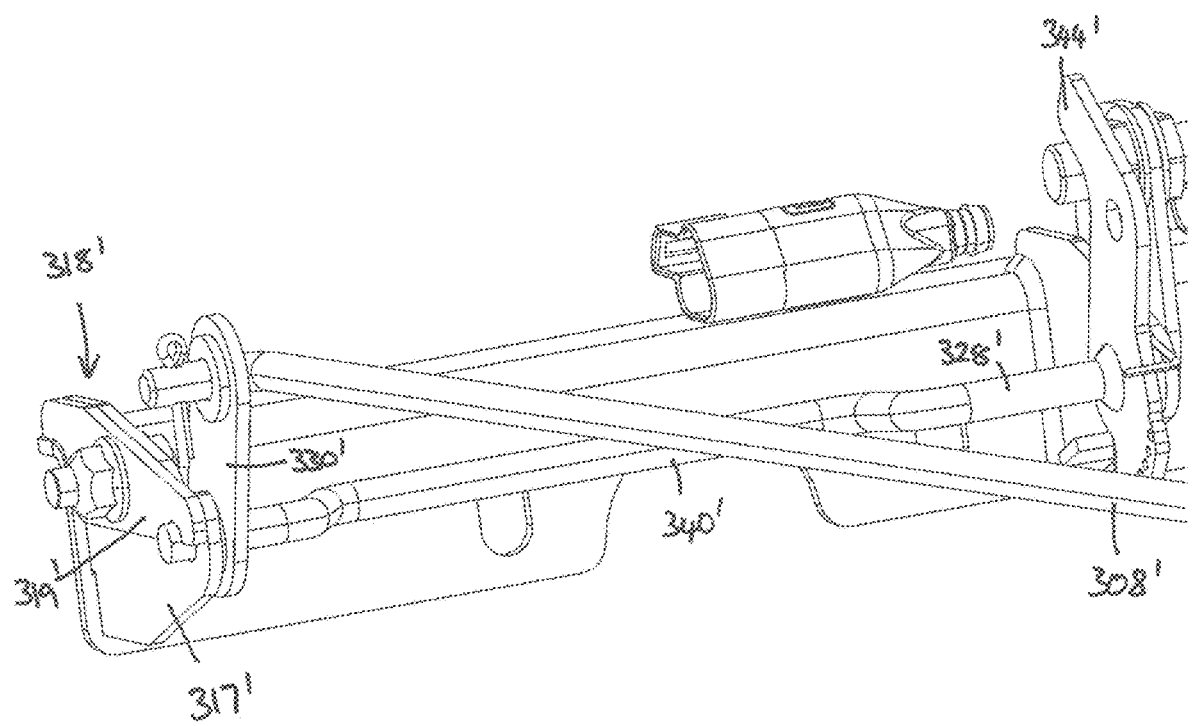
FIG. 19 shows a second perspective view of the twine tension monitoring portion of FIG. 14.

The second set of plates 318', namely a lower plate 317' and an upper plate 319', are provided at the left of the support housing as seen in FIGS. 14, 18 and 19.

The shaft 328' of the left of FIG. 14 is similar to the shaft 328 on the right of FIG. 14 and includes a first armature 344' and an associated biasing element (conveniently a helical spring 350'). The shaft 328' differs in that the third portion 340' of the shaft extends into a second intermediate portion which in turn extends into a final fifth portion at the far end of the shaft 328'. The first and fifth portions of the shaft are aligned along a common axis of rotation. Toward the far end of the shaft 328', the shaft 328' is provided with a second armature 330" fixed in relation to the shaft 328', such that pivoting of the shaft 328' causes movement of the armature 330'. The far end of the shaft 328' is supported for rotation by the opening defined between the second set of plates 318'. A first end of a connecting element 308' is connected to an upper end of the armature 330'.

It will be appreciated that the disclosed twine tension monitoring apparatus 302 may be retrofitted to a baler.

From reading the present disclosure, other modifications will be apparent to persons skilled in the art. Such modifications may involve other features which are already known in the field of small square balers and component parts therefore and which may be used instead of or in addition to features already described herein.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. A twine tension monitoring apparatus for detecting the twine tension in a baler during operation of the baler comprises a twine tension monitoring portion and a signalling portion connected to the monitoring portion, in which the twine tension monitoring portion is, in use, located between a knotter and a leading edge of a forming bale, and the twine tension monitoring portion comprises an element rotatable about a horizontally extending axis between a first position and a second position, in which the first position corresponds to a low tension condition and the second position corresponds to a tensioned condition, the signalling portion providing a signal indicating the position of the rotatable element.

2. The twine tension monitoring apparatus according to claim 1, wherein the rotatable element comprises a first laterally extending finger supported on a first armature connected to a shaft having a longitudinally extending axis, the longitudinally extending axis corresponding to the horizontally extending axis about which the first laterally extending finger moves.

3. The twine tension monitoring apparatus according to claim 2, wherein the first laterally extending finger is biased towards the first position.

4. The twine tension monitoring apparatus according to claim 3, wherein a torsion spring biases the shaft to bias the first laterally extending finger towards the second position.

5. The twine tension monitoring apparatus according to claim 1, in which the first position corresponds to the rotatable element riding on an upper surface of the forming bale and the second position being spaced from the surface of a forming bale.

6. The twine tension monitoring apparatus according to claim 1, wherein the signalling portion is mechanically connected to the monitoring portion.

7. The twine tension monitoring apparatus according to claim 1, wherein the signalling portion is electrically connected to the monitoring portion.

8. The twine tension monitoring apparatus according to claim 7, in which the signalling portion comprises an electrical sensor in electrical communication with an electronic control unit, the electronic control unit being in electrical communication with a Human Machine Interface.

9. The twine tension monitoring apparatus according to claim 8, in which the electrical sensor is an electrical switch actuated when the rotatable element is in the first position.

10. The twine tension monitoring apparatus according to claim 8, in which the electrical sensor signals an angular displacement of the rotatable element between the first position and the second position.

11. The twine tension monitoring apparatus according to claim 8, in which the electronic control unit receives signals representative of an actual position of the rotatable element from the electrical sensor, determines an anticipated position of the rotatable element, compares the received signals representative of the actual position of the rotatable element with the anticipated position of the rotatable element and, in the event of a disparity generates a signal to the Human Machine Interface to cause an error condition to be signalled to an operator.

12. The twine tension monitoring apparatus according to claim 11, in which in the event of the electronic control unit detecting a disparity the electronic control unit also generates a signal to cause operation of the baler to cease.

13. A twine tension monitoring apparatus for detecting the twine tension in a baler during operation of the baler comprises a twine tension monitoring portion and a signalling portion connected to the monitoring portion, in which the twine tension monitoring portion is, in use, located between a knotter and a leading edge of a forming bale, and the twine tension monitoring portion comprises an element rotatable about a horizontally extending axis between a first position and a second position, in which the first position corresponds to a low tension condition and the second position corresponds to a tensioned condition, the signalling portion providing a signal indicating the position of the rotatable element, wherein the rotatable element comprises a third portion of a shaft offset from a first portion of the shaft, the first portion of the shaft being connected to an armature.

14. The twine tension monitoring apparatus according to claim 13, wherein the third portion of the shaft is biased towards the first position.

15. The twine tension monitoring apparatus according to claim 14, wherein a torsion spring biases the shaft to bias the third portion of the shaft towards the second position.

16. An agricultural baler provided with a twine tension monitoring apparatus for detecting the twine tension in a baler during operation of the baler comprises a twine tension monitoring portion and a signalling portion connected to the monitoring portion, in which the twine tension monitoring portion is, in use, located between a knotter and a leading edge of a forming bale, and the twine tension monitoring portion comprises an element rotatable about a horizontally extending axis between a first position and a second position, in which the first position corresponds to a low tension condition and the second position corresponds to a tensioned condition, the signalling portion providing a signal indicating the position of the rotatable element.

17. The agricultural baler according to claim 16, the baler incorporating a twine reservoir, in which the twine tension monitoring portion is located to a first side of the knotter and the signalling portion is mechanically actuated and located to a second side of the knotter.

* * * * *